United States Patent [19]

Huang

[11] 4,069,296
[45] Jan. 17, 1978

[54] PROCESS FOR THE EXTRACTION OF ALUMINUM FROM ALUMINUM ORES

[76] Inventor: Wen H. Huang, Texas A & M University, College Station, Tex. 77843

[21] Appl. No.: 731,025

[22] Filed: Oct. 8, 1976

[51] Int. Cl.² .............................................. C01F 7/22
[52] U.S. Cl. ................................... 423/127; 423/132; 423/343; 423/629
[58] Field of Search ............... 423/126, 132, 489, 127, 423/133, 343

[56] References Cited

U.S. PATENT DOCUMENTS

| | | | |
|---|---|---|---|
| 508,796 | 11/1893 | Ackermann | 423/126 |
| 725,683 | 4/1903 | Doremus | 423/132 |
| 1,036,453 | 8/1912 | Childs | 423/132 |
| 1,215,351 | 2/1917 | Doremus | 423/132 |
| 1,237,488 | 8/1917 | Doremus | 423/489 |
| 1,403,183 | 1/1922 | Milligan | 423/126 |
| 2,842,426 | 7/1958 | Glocker | 423/126 |
| 3,961,030 | 6/1976 | Wiewiorowski et al. | 423/489 |

FOREIGN PATENT DOCUMENTS

| | | | |
|---|---|---|---|
| 164,900 | 8/1955 | Australia | 423/132 |
| 116,118 | 6/1918 | United Kingdom | 423/132 |

*Primary Examiner*—Herbert T. Carter
*Attorney, Agent, or Firm*—George H. Baldwin; Arthur G. Yeager

[57] ABSTRACT

Aluminum may be recovered from various raw materials including kaolinite, alunite, coal ash and slag, and both raw and spent oil shale, by contacting such materials with an aqueous solution of hydrofluoric acid, followed by removal of the insoluble residues remaining suspended in solution and the precipitation of hydrated aluminum hydroxide from the clear solution by basification with an alkaline agent.

11 Claims, 1 Drawing Figure

PROCESS FOR THE EXTRACTION OF ALUMINUM FROM ALUMINUM ORES

BACKGROUND OF THE INVENTION

The present invention relates to metallurgy in general and to processes for the recovery of aluminum from its ores in particular.

In my prior U.S. Pat. No. 3,958,982, which is specifically incorporated by reference herein, and to which reference may be made for a full understanding of the background of the present invention, the shortcomings of the Bayer process were enumerated. Among these shortcomings is the fact that that process is only capable of extracting aluminum with maximum efficiency from hydrated aluminum oxide ore materials such as gibbsite and boehimite. Thus potential aluminum sources such as the kaolins or goethite are generally viewed as being unsuitable as starting materials in the Bayer process. In addition, any aluminum ore material containing in excess of 5% silica is generally considered unsuitable for use in the Bayer process due to the cost of the digestive removal of the silica. Finally, the very small particle size found in many bauxite ores results in the formation of "red mud" which is only difficultly separated from the alkaline aluminate liquor.

For these and other reasons my prior patent disclosed and claimed the use of various naturally occurring acids such as citric, tartaric and salicylic acids, in a process wherein the aluminum containing ore is treated with a solution containing one or more of such acids in order that the aluminum present in the ore may be complexed by the acid anions are carried into solution. This extraction is followed by filtration to remove the insoluble matter from the solution containing the complexed aluminum, and the filtrate is subsequently treated with a basic reagent whereby aluminum hydroxide is precipitated and removed from solution.

Despite the success of such process, there remains a need for a process which will accomplish a similarly efficient removal of aluminum from ores which are presently not amenable to the Bayer process, and also do so even more economically than my prior process.

SUMMARY

It has now been discovered that aluminum may be efficiently and economically extracted and recovered from raw materials such as kaolinite, alunite, coal ash and slag, and raw and spent oil shale by a hydrofluoric acid extraction process. Broadly stated, the process of the present invention comprises the following four steps:

1. Extracting the aluminum containing raw-material for a predetermined period of time with an aqueous solution of hydrofluoric acid to form an aqueous solution containing aluminum ions in association with from zero to six fluoride ions;
2. Removing the insoluble residue from the aluminum containing solution, such as by filtration etc;
3. Recovering a precipitate consisting essentially of aluminum hydroxide from the filtrate from step (2), by the controlled addition of an alkaline agent and the removal of any non-aluminum hydroxide precipitates; and
4. Isolating aluminum in a useful form, ie by filtration and calcination of the precipitate to form alumina.

In an alternative embodiment of my process, the addition of the alkaline agent in step (2) may be stopped just short of the point at which aluminum hydroxide precipitates, the solution filtered, and evaportated to dryness. By so doing, a solid aluminum compound will be deposited, and the vapor driven off will contain a significant percentage of the hydrofluoric acid originally used as the extractant, which may be recycled for subsequent use.

The recovery of HF may be maximized by adding a stoichiometric excess of an inorganic acid of lower volatility than HF such as $H_2SO_4$ or $H_3PO_4$. By so doing, the acid counter ion, ie, $SO_4^{-2}$ or, $PO_4^{-3}$, will replace the fluoride ion, allowing virtually all the HF present to vaporize on heating.

The process is facilitated and accelerated by the use of fine particle sizes in the raw materials. In addition, because silicon, which is present as an impurity in a significant amount of most aluminum containing raw materials, is converted to $SiF_4$ gas by the reagent solution, under certain conditions silicon may be separated and recovered as a byproduct from the solution. Finally, the present process is capable of functioning at room temperature, rather than at the elevated temperatures required by the Bayer process, and, as such, represents an improvement over the Bayer process and my prior process.

DESCRIPTION OF THE PREFERRED EMBODIMENT

Figure 1:
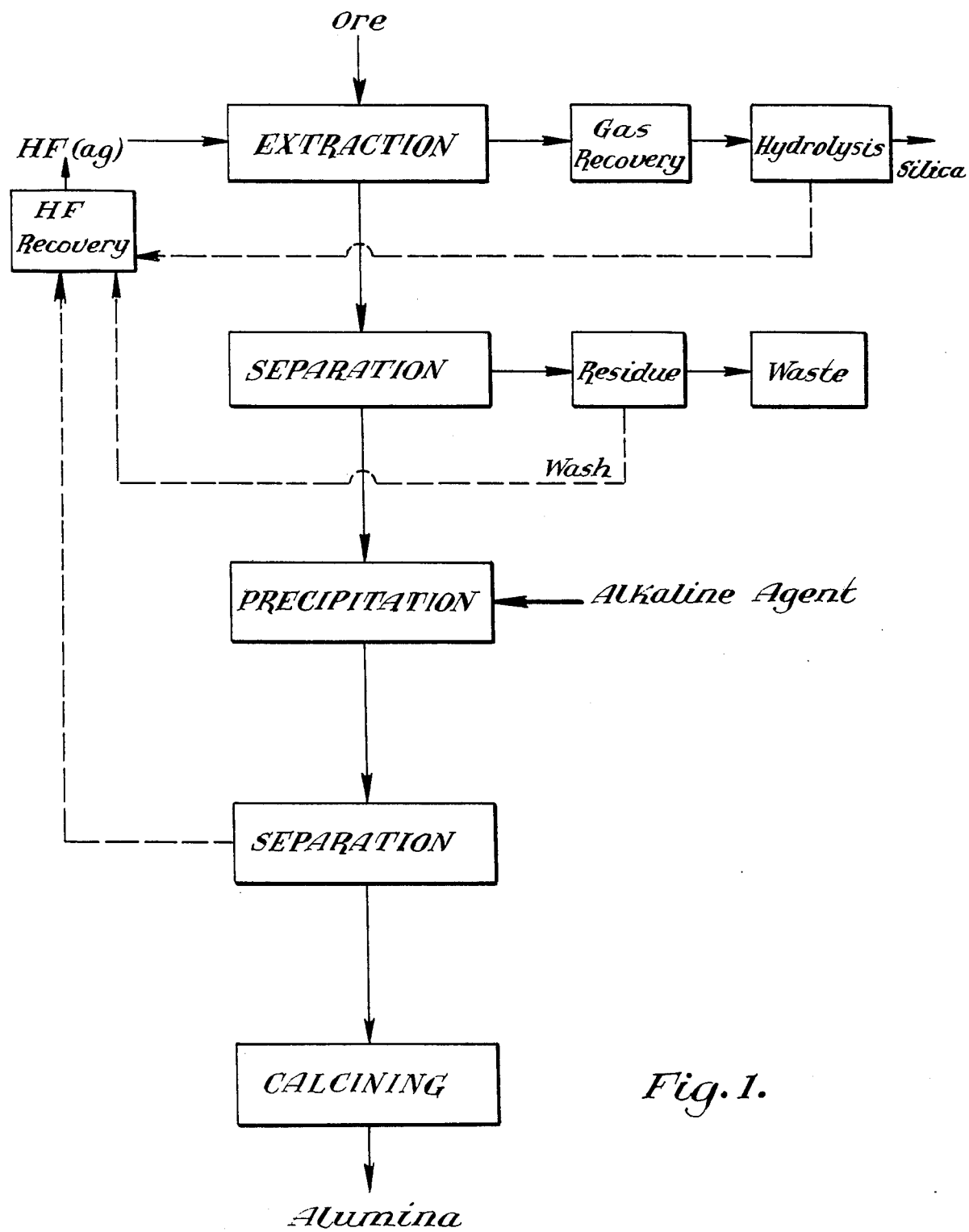
FIG. 1 is a schematic flow chart of the steps comprising the preferred embodiment of my process.

A complete understanding of my process will be gained by those skilled in the art from the following discussion with reference to the drawing.

The process of the present invention comprises extracting aluminum from aluminum-containing raw material separating the aqueous solutions containing the dissolved aluminum from the resultant insoluble residue, precipitating the aluminum from the solution and calcining the precipitate to yield a final aluminum product.

It is further contemplated that the process of the present invention may also be utilized for the recovery of silicon as a by-product.

In the preferred embodiment of my invention, an aluminum ore is ground to a uniform particle size, preferably not greater than 2mm. The ground ore is then fed to an extraction vessel in which at least the interior is fabricated from stainless steel, a synthetic material such as tetrafluoroethylene, polyethylene or the like, or any other material which is resistant to attack by hydroflouric acid, the vessel is also preferably equipped with means for agitation such as paddle wheels, vibrators or the like, as is well known to those skilled in the art.

Hydrofluoric acid of from about 2% to about 52% preferably from about 25% to about 30%, by weight is added to the vessel in sufficient quantity to extract the aluminum from the ore preferably in a volume to weight ratio of about 4:1 (liters $HF_{(aq)}$ to kg ore). The resulting mixture is agitated gently in order to promote the extraction reaction for a sufficient period of time to accomplish the extraction, preferably not more than two hours. As will be evident to those skilled in the art, the rate of extraction will be a function both of reagent concentration and of contact time. Thus a wide but coordinated variation in both conditions is contemplated for the process.

The temperature of the extraction step is controlled at not greater than 100° C, and preferably at not greater than 30° C, by choice of reagent concentration, rate of addition and/or amount of agitation. As is disclosed hereinbelow, the exothermic nature of the extraction reaction results in generally better extraction rates at low temperatures. Naturally, any conventional cooling means may be utilized to control solution temperature if desired.

Upon completion of the extraction step, the insoluble residue is separated from the aluminum-containing solution by any one of the conventional methods, ie, filtration, centrifugation, decantation, etc. The separated residue is then preferably washed with a small additional amount of HF extraction solution and the washings combined with the first solution. The remaining residue is then preferably washed with water, and the washings recycled to an HF recovery operation as further described hereinbelow whereas the, HF-free residue is discarded.

As is well known to those skilled in the art, many aluminum-containing materials also contain other hydrolysable elements such as iron and silicon oxides. Since these elements will also be dissolved by hydrofluoric acid solutions, they must be separated from the dissolved aluminum prior to its precipitation. The process conventionally employed for such separation utilizes the differences in the acidities of the hydrated cations by sequentially increasing the solution pH with an alkaline agent and removing the precipitated hydrated metallic oxides. Thus hydrated iron oxide will precipitate at pH 4–5 whereas hydrated aluminum hydroxide will precipitate between pH 7 and 9. Thus the pH of the solution may be raised to 6.0–6.5, the solution filtered to remove the precipitated iron hydroxide, and the pH raised to not more than 10 to precipitate the aluminum. Care must be taken to maintain the solution pH at not greater than 10 to avoid redissolution of the amphoteric hydrates aluminum hydroxide. The preferred alkaline agent would be a moderately concentrated alkali metal hydroxide such as 6 M NaOH, but any alkaline agent may be used so long as its pH is not less than 10 and it will not interfere with subsequent process steps.

The hydrated aluminum hydroxide precipitate is separated from the solution, once again, by any conventional method consistant with the process. The clear solution, containing fluoride ions and the cation of the alkaline agent, is routed to a fluoride recovery operation, whereas the solid aluminum compound is routed to a calcining operation for the production of alumina.

The fluoride recovery operation referred to herein above may comprise any conventional operation capable of recovering fluoride in a useful form from its aqueous solutions, such as by the precipitation of calcium fluoride by the addition of an aqueous solution of a soluble calcium salt. From the recovered fluoride, hydrogen fluoride may be generated for reuse in the extraction, ie, by treatment of the residue with concentrated sulfuric acid thereby improving the economics of the process.

In one embodiment of my process, the extraction conditions may be predetermined to be consistant with the generation of silicon tetrafluoride from the silicious materials contained in the ore. Under such conditions the extraction is preferably run in a closed vessel equipped with vapor withdrawal apparatus enabling the operator to withdraw the $SiF_4$ from the extraction vessel and to treat it in a conventional manner in a subsequent operation. One such operation may comprise hydrolysis to form HF and silica and the subsequent recycling of the HF solution as shown in FIG. 1.

The examples and Tables which follow report the results of the extraction of aluminum from a variety of raw materials, such as coal ash, kaolinite, bauxite, alunite, and both raw and spent oil shale under a variety of conditions. In each of the following examples, the extraction solution was filtered and diluted to a specific volume for the quantitative measurement of aluminum content by flameless atomic absorption techniques, as is well known to those skilled in the art. All percentage concentrations quoted herein are by weight.

EXAMPLE I

In order to compare the effectiveness of using hydrofluoric acid in the extraction of aluminum with that of using the complexing citric acid and lemon juice disclosed in my prior patented process (U.S. Pat. No. 3,958,982), as well as with other inorganic solvents, the following procedure was followed. A five hundred milligram (500 mg) sample of each aluminum-containing raw material was extracted with 2 milliliters (2 ml) of concentrated hydrofluoric acid (HF, 52%) at 97° C for one hour in a closed polyethylene system. For comparison similar experiments were conducted with 2 ml of citric acid (H Cit; 4M), lemon juice (LA; approximately 0.2M), aqua regia (AR; 1 part concentrated $HNO_3$, 3 parts concentrated HCl,) hydrochloric acid (HCl; 36%), and sodium hydroxide (NaOH; 12.5). Following extraction, each individual aluminum solution was separated from the insoluble residue, diluted to a known volume, and analyzed for aluminum content in the solution by flameless atomic absorption spectrophotometry, as is well known to those skilled in the art. The number of milligrams (mg) of aluminum extracted form the 500 mg sample of raw material under the quoted conditions are tabulated in Table I.

TABLE I

| | WEIGHT (mg) OF Al EXTRACTED FROM 500 mg. SAMPLE AFTER 1 HOUR AT 97° C IN A CLOSED SYSTEM WITH VARIOUS REAGENTS | | | | | |
|---|---|---|---|---|---|---|
| Sample/Reagent | HF 52% | $H_3Cit$ 4M | LA 20.2M | AR | HCl 36% | NaOH 12.5M |
| Coal Slag | 19.21 | 0.49 | 0.41 | 2.02 | 6.07 | 2.78 |
| Coal Ash - I (Kentucky) | 27.30 | 9.10 | 4.80 | 18.70 | 25.28 | 2.28 |
| Coal Ash - II (Unknown) | 25.28 | 2.27 | 1.28 | 7.58 | 11.12 | 3.54 |
| Coal Ash - III (Illinois) | 21.48 | 1.26 | 1.05 | 3.29 | 4.30 | 1.52 |
| Coal Ash - IV (W. Va.) | 54.34 | 1.77 | 1.26 | 6.82 | 10.36 | 4.04 |
| Kaolinite (Georgia) | 94.28 | 0.84 | 0.33 | 1.10 | 1.26 | 4.04 |
| Bauxite | 128.90 | 11.37 | 3.79 | 56.87 | 113.74 | 122.58 |

TABLE I-continued

WEIGHT (mg) OF Al EXTRACTED FROM 500 mg. SAMPLE AFTER 1 HOUR AT 97° C IN A CLOSED SYSTEM WITH VARIOUS REAGENTS

| Sample/Reagent | HF 52% | H₃Cit 4M | LA 20.2M | AR | HCl 36% | NaOH 12.5M |
|---|---|---|---|---|---|---|
| (Arkansas) Alunite | 61.92 | 0.61 | 0.15 | 1.15 | 2.53 | 70.77 |
| Spent Oil Shale | 3.79 | 15.67 | 3.79 | 21.48 | 20.73 | 8.34 |
| Raw Oil Shale | 11.37 | 15.92 | 1.52 | 18.45 | 19.21 | 7.08 |

Coal Ash — I, II, III, and IV represent four distinct kinds of ash generated from coals mined in four different coal regions. As shown by these results, hydrofluoric acid solution extracted more aluminum than did citric acid or lemon juice by factors of up to 112 from all samples except the oil shales. Of particular note is that the extraction of aluminum by hydrofluoric acid is also significantly higher than that by other inorganic solvents, with the exceptions of the oil shales and the Alunite/NaOH system.

EXAMPLE II

In order to determine the effect of temperature on the extraction of aluminum from raw materials the following procedure was used. Five hundred milligram (500 mg) samples of individual raw materials were extracted with 2 ml of concentrated hydrofluoric acid solution (52% W/W) at temperatures of 25° C, 70° C, 97° C, and 100° C, for one hour in a closed, polyethylene system. After extraction, the solution was filtered, diluted to known volume and the aluminum content determined by flameless atomic absorption spectrophotometry. The results of this comparison test are given in Table II.

TABLE II

WEIGHT (mg) OF ALUMINUM EXTRACTED BY CONC HYDROFLUROIC ACID FROM A 500 mg SAMPLE AFTER 1 HOUR AT VARIOUS TEMPERATURES IN A CLOSED SYSTEM

| SAMPLE | 25° C | 70° C | 97° C | 100° C |
|---|---|---|---|---|
| Coal Slag | 29.20 | 22.24 | 19.21 | 12.38 |
| Coal Ash - I (Kentucky) | 32.11 | 26.03 | 27.30 | 18.20 |
| Coal Ash - II (Unknown) | 33.24 | 24.52 | 25.28 | 22.24 |
| Coal Ash - III (Illinois) | 24.52 | 20.73 | 21.48 | 19.21 |
| Coal Ash - IV (W. Va.) | 67.61 | 49.29 | 54.34 | 37.41 |
| Kaolinite (Georgia) | 95.36 | 83.99 | 94.28 | 87.51 |
| Bauxite (Arkansas) | 168.93 | 147.14 | 128.90 | 126.30 |
| Alunite | 33.49 | 54.34 | 61.92 | 27.30 |
| Spent Oil Shale | 21.30 | 9.35 | 3.79 | 10.87 |
| Raw Oil Shale | 12.45 | 3.79 | 11.37 | 13.65 |

With only slight exception within a 15% experimental error range, the data shown in TABLE II appears to confirm the qualitative observation that the extraction of aluminum by concentrated hydrofluoric acid is exothermic. For this reason the efficiency of the extraction process appears to decrease with increasing temperature.

With the exception of Alunite and Raw Oil Shale the extraction process appears to be most efficient at 25° C.

EXAMPLE III

In order to determine the effect of the ambient atmosphere on the process, the extraction of aluminum by hydrofluoric acid was conducted in an open system rather than in the closed system used in Examples I and II. Once again, five hundred milligrams (500 mg) of individual raw materials were extracted with 2 ml aliquots of hydrofluoric acid (52% W/W) for one hour at temperatures of 25° C, 70° C, and 97° C, in a polyethylene system. After extraction, the aluminum-containing solution was separated from the extracted residue, diluted to volume and analysed for aluminum using the flameless atomic absorption spectrophotometric method. The amount (mg) of aluminum extracted from each 500 mg sample of each raw material is shown in Table III.

TABLE III

WEIGHT (mg) OF ALUMINUM EXTRACTED BY CONCENTRATED HYDROFLUORIC ACID FROM A 500 mg SAMPLE AFTER 1 HOUR AT VARIOUS TEMPERATURES IN AN OPEN SYSTEM

| SAMPLE/T (C°) | 25 | 70 | 97 |
|---|---|---|---|
| Coal Slag | 26.52 | 21.47 | 15.16 |
| Coal Ash - I (Kentucky) | 28.42 | 24.00 | 22.10 |
| Coal Ash - II (Unknown) | 27.15 | 23.37 | 20.84 |
| Coal Ash - III (Illinois) | 23.37 | 20.84 | 15.79 |
| Coal Ash - IV (W. Va.) | 52.41 | 41.68 | 37.26 |
| Kaolinite (Georgia) | 101.04 | 90.31 | 101.36 |
| Bauxite (Arkansas) | 135.14 | 130.09 | 98.51 |
| Alunite | 30.94 | 33.47 | 5.05 |
| Spent Oil Shale | 27.79 | 3.79 | 12.63 |
| Raw Oil Shale | 13.89 | 10.10 | 8.84 |

With the exception of individual runs for Kaolinite and oil shale, aluminum extraction by hydrofluoric acid in an open system appears to be only slightly less efficient than that run in a closed system (Example II). Thus, the extraction of aluminum by hydrofluoric acid may be conducted in an open-air system, (which is more feasible technologically and economically in industrial applications) with only a slight loss in efficiency.

EXAMPLE IV

In order to determine the effect of reagent strength on the process of the present invention, extractions were conducted with 2 ml. of each of three concentrations of hydrofluoric acid solution for each raw material at 97° C for one hour in a closed system. The resulting amount (mg) of aluminum extracted from the raw material at the different acid strengths are shown in Table IV.

TABLE IV

WEIGHT (mg) OF ALUMINUM EXTRACTED BY VARIOUS STRENGTHS OF HYDROFLUORIC ACID FROM A 500 mg SAMPLE AFTER 1 HOUR AT 97° C IN CLOSED SYSTEM

| SAMPLES /REAGENT CONC. | 52% W/W HF | 26% W/W HF | 2.6% W/W HF |
|---|---|---|---|
| Coal Slag | 19.21 | 22.75 | 7.84 |
| Coal Ash - I | 27.30 | 24.01 | 8.59 |
| Coal Ash - II | 25.28 | 22.75 | 4.55 |
| Coal Ash - III (Illinois) | 21.48 | 14.91 | 3.29 |
| Coal Ash - IV | 54.34 | 54.59 | 9.61 |

TABLE IV-continued
WEIGHT (mg) OF ALUMINUM EXTRACTED BY VARIOUS STRENGTHS OF HYDROFLUORIC ACID FROM A 500 mg SAMPLE AFTER 1 HOUR AT 97° C IN CLOSED SYSTEM

| SAMPLES /REAGENT CONC. | 52% W/W HF | 26% W/W HF | 2.6% W/W HF |
|---|---|---|---|
| (W. Va.) Kaolinite | 94.28 | 94.78 | 13.40 |
| (Georgia) Bauxite | 128.90 | 157.88 | 26.79 |
| (Arkansas) Alunite | 61.92 | 39.43 | 2.28 |
| Spent Oil Shale | 3.79 | 10.11 | Undetectable |
| Raw Oil Shale | 11.37 | 2.02 | 0.76 |

The data shown in Table IV indicates that the extraction process of my invention is effective over at least the 20-fold range of dilution used in Example IV. Despite a decrease in efficiency at the low end of the dilution scale, the process appears, nevertheless, to be operative. Kaolinite and coal ash IV yield virtually identical amounts of Aluminum to both 26% and 52% HF, with only Raw oil shale exhibiting a drastic decrease in effectiveness for 26% HF.

In summary, the results of these examples show four significant points. First, aluminum is, in general, more effectively and economically extracted from aluminum — containing raw materials by hydrofluoric acid solution than by either complexing organic acids or by other relatively concentrated inorganic acid or alkaline solutions.

Second, the extraction of aluminum by hydrofluoric acid can be, and is preferably, conducted at or about 25° C because of the exothermic nature of the reaction, thus promoting energy conservation and facilitating operation procedures on an industrial scale.

The first two advantages are demonstrated in Table V, which compares the number of tons of each raw material that would be needed to be extracted by the various reagents at the temperature shown for one hour in order to produce one ton of aluminum.

TABLE V
TONS OF SAMPLE NECESSARY TO PRODUCE ONE TON OF ALUMINUM BY EXTRACTION WITH VARIOUS REAGENTS

| Sample/Reagent | HF (25° C) | HF (97° C) | H₂Cit (97° C) | L.J. (97° C) | AR (97° C) | HCl (97°) | NaOH (97° C) |
|---|---|---|---|---|---|---|---|
| Coal Slag | 17 | 26 | 1020 | 1220 | 248 | 82 | 180 |
| Coal Ash - I | 16 | 18 | 55 | 104 | 27 | 20 | 219 |
| (Georgia) Coal Ash - II | 15 | 20 | 220 | 391 | 66 | 45 | 141 |
| (Unknown) Coal Ash - III | 20 | 23 | 397 | 476 | 152 | 116 | 329 |
| (Illinois) Coal Ash - IV | 7 | 9 | 282 | 397 | 73 | 48 | 124 |
| (W. Va.) Kaolinite | 5 | 5 | 595 | 1515 | 455 | 397 | 124 |
| (Georgia) Bauxite | 3 | 4 | 44 | 132 | 9 | 4 | 4 |
| (Arkansas) Alunite | 15 | 8 | 820 | 3333 | 435 | 198 | 7 |
| Shale Spent Oil | 23 | 132 | 32 | 132 | 23 | 24 | 60 |
| Shale Raw Oil | 40 | 44 | 31 | 329 | 27 | 26 | 71 |

Thus it is believed that the use of hydrofluoric acid to extract aluminum from aluminum ores at 25° C tends to be more economical than extraction with the use of other reagents because a greater percentage of the total aluminum may be extracted from the ore per unit time.

The third significant point concerning my invention is that silicious materials combined with the aluminum in the raw materials not only cause no difficulty to the extraction of aluminum, but rather, under certain conditions well known to those skilled in the art will act as a source of silicon which is converted to gaseous silicon tetrafluoride, $SiF_4$, during the extraction process. Thus, under the appropriate extraction conditions, my invention will allow the separation and recovery not only of aluminum, but also of silicon, as $SiF_4$, which may subsequently be used as a source for fluoride recovery and recycling.

Finally, my invention has the significant advantage that it operates on aluminum-containing raw materials irrespective of how small their particle size or their crystalline state. Thus many waste materials such as coal ash and slag, lignite ash and spent oil shale which may have fine particle size or which may have become amorphous or glassy during prior treatment will function excellently in my process.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for the extraction and recovery of aluminum values from an aluminum ore comprising:
    a. treating said aluminum ore with a aqueous solution of hydrofluoric acid, said aqueous solution of hydrofluoric acid containing not less than about 2 weight percent of HF;
    b. adjusting the temperature of said solution to a value not greater than about 100° C to form an aqueous solution containing a dissolved aluminum ion complex and an insoluble residue;
    c. removing said insoluble residue from said aqueous solution containing dissolved aluminum ion complex;
    d. increasing the pH of said aqueous solution to a valve of not greater than that at which hydrated aluminum hydroxide precipitates by the addition of an alkaline reagent and removing any non-aluminum hydroxide precipitates;
    e. mixing said aqueous solution containing dissolved aluminum ion complex with sufficient additional alkaline reagent to precipitate substantially all said aluminum values as hydrated aluminum hydroxide; and f. recovering said hydrated aluminum hydroxide from said aqueous solution.

2. The process as set forth in claim 1 wherein recovery comprises filtering said aqueous solution containing said precipitate to yield a filtercake containing hydrated aluminum hydroxide.

3. The Process as set forth in claim 2 wherein said increasing and said mixing steps comprise:
 a. increasing the pH of said aqueous solution containing dissolved aluminum ion complex to not less than about 6 and not more than about 6.5;
 b. filtering the resultant solution to obtain a substantially clear filtrate; and
 c. increasing the pH of said filtrate to a value not greater than about 10.

4. The process as set forth in claim 3 additionally comprising calcining said filtercake containing hydrated aluminum hydroxide to form alumina.

5. A process for the extraction and recovery of aluminum values from an aluminum ore comprising:
 a. grinding said aluminum ore to a fine particle size;
 b. treating said aluminum ore with an aqueous solution of hydrofluoric acid, said aqueous solution of hydrofluoric acid consisting essentially of not less than about two weight percent of HF and water, to form an aqueous solution containing an aluminum ion complex and an insoluble residue;
 c. restricting the temperature of said solution containing said aluminum ion complex to a value not greater than about 100° C;
 d. removing said insoluble residue from said solution containing said aluminum complex to yield a clear solution;
 e. adding an aqueous solution of from between about 1M and about 6M sodium hydroxide to said clear solution in sufficient quantity to form a combined solution having a pH of between about 6 and about 6.5;
 f. removing any precipitated solids from said combined solution to yield a second clear solution;
 g. adding an additional quantity of said sodium hydroxide solution to said second clear solution sufficient to increase the pH of said second clear solution to between about 9 and about 10 such that a precipitate consisting essentially of hydrated aluminum hydroxide is formed;
 h. removing said hydrated aluminum hydroxide from said second clear solution by filtration; and
 i. calcining said hydrated aluminum hydroxide precipitate to form alumina.

6. The process as set forth in claim 5 wherein said temperature of sub-paragraph 7c is restricted to a range of from about 20° C to about 30° C.

7. The process as set forth in claim 6 wherein said temperature is ambient temperature.

8. The process as set forth in claim 5 wherein the solution of hydrofluoric acid of sub-paragraph 7b is from about 26 percent by weight to about 52 percent by weight.

9. The process as set forth in claim 8 wherein said hydrofluoric acid strength is about 50 percent by weight.

10. The process as set forth in claim 5 wherein said aluminum ore contains a hydrolyzable silicon compound, additionally comprising evolving silicon tetrafluoride gas during the treating of sub-paragraph 7b.

11. The process as set forth in claim 10 additionally comprising collecting said silicon tetrafluoride gas.

* * * * *